(12) United States Patent
Kim et al.

(10) Patent No.: US 8,456,136 B2
(45) Date of Patent: Jun. 4, 2013

(54) METHOD AND APPARATUS FOR BATTERY GAUGING IN PORTABLE TERMINAL

(75) Inventors: Jin-Kyu Kim, Daegu (KR); Dong-Yoon Oh, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 786 days.

(21) Appl. No.: 12/570,381

(22) Filed: Sep. 30, 2009

(65) Prior Publication Data

US 2010/0085016 A1   Apr. 8, 2010

(30) Foreign Application Priority Data

Oct. 7, 2008  (KR) .......................... 10-2008-0098134

(51) Int. Cl.
*H02J 7/00*  (2006.01)
*G01N 27/416*  (2006.01)
*G08B 21/00*  (2006.01)

(52) U.S. Cl.
USPC .......... 320/136; 320/150; 320/148; 320/155; 320/160; 324/426; 340/636.1; 340/636.21

(58) Field of Classification Search
USPC ......................................................... 320/136
See application file for complete search history.

(56) References Cited

U.S. PATENT DOCUMENTS

| | | | | |
|---|---|---|---|---|
| 5,691,742 A * | 11/1997 | O'Connor et al. | ............ | 715/835 |
| 6,252,511 B1 * | 6/2001 | Mondshine et al. | ....... | 340/636.1 |
| 6,388,447 B1 * | 5/2002 | Hall et al. | ...................... | 324/426 |
| 6,956,487 B2 * | 10/2005 | Herrmann et al. | ........ | 340/636.12 |
| 7,102,684 B1 * | 9/2006 | Higuchi et al. | ............... | 348/372 |
| 7,109,876 B2 * | 9/2006 | Smith et al. | ................. | 340/636.1 |
| 7,554,456 B2 * | 6/2009 | Chen | ............................ | 340/636.2 |

* cited by examiner

*Primary Examiner* — Yalkew Fantu
(74) *Attorney, Agent, or Firm* — Jefferson IP Law, LLP

(57) ABSTRACT

A method and apparatus for battery gauging in a portable terminal are provided. In the battery gauging method, it is determined in a low-power mode whether a listening interval occurs for detecting the presence of a received signal. The remaining battery capacity is detected if the listening interval occurs. An interrupt signal is transmitted to the second processor, operating in a low-power mode, if the remaining battery capacity is less than or equal to a threshold. Upon receipt of the interrupt signal, the second processor wakes up to interrupt the power of the portable terminal.

21 Claims, 5 Drawing Sheets ical Property Office on Oct. 7, 2008 and assigned Serial No. 10-2008-0098134, the entire disclosure of which is hereby incorporated by reference.

METHOD AND APPARATUS FOR BATTERY GAUGING IN PORTABLE TERMINAL

PRIORITY

This application claims the benefit under 35 U.S.C. §119(a) of a Korean patent application filed in the Korean Intellectual Property Office on Oct. 7, 2008 and assigned Serial No. 10-2008-0098134, the entire disclosure of which is hereby incorporated by reference.

BACKGROUND OF THE INVENTION

1. Field of the Invention

The present invention relates to an apparatus and method for power control in a portable terminal. More particularly, the invention relates to an apparatus and method for reducing the power consumed during battery gauging in a portable terminal.

2. Description of the Related Art

A portable terminal displays its remaining battery capacity on its display unit so that a user can detect the remaining battery capacity. Hereinafter, a process for displaying the remaining battery capacity in the portable terminal is referred to as 'battery gauging.'

The portable terminal performs periodic battery gauging in order to display an accurate remaining battery capacity. For example, when the portable terminal operates in an active mode, it performs battery gauging at short periods to display the remaining battery capacity on the display unit.

Also, when the portable terminal operates in a low-power mode in order to reduce the battery power consumption, it performs periodic battery gauging to display the remaining battery capacity on the display unit. Herein, the low-power mode includes a sleep mode and an idle mode.

If the portable terminal operating in a low-power mode performs periodic battery gauging, it periodically wakes up for the purpose of battery gauging, thus increasing the power consumption.

Accordingly, there is a need for an apparatus and method for reducing the amount of power consumed during battery gauging in a portable terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing the battery gauging power consumption in a portable terminal.

Another aspect of the present invention is to provide an apparatus and method for reducing the battery gauging power consumption in a portable terminal operating in a low-power mode.

In accordance with an aspect of the present invention, a method for battery gauging in a portable terminal having at least two processors is included. The method includes determining, by the first processor, whether a listening interval occurs for detecting the presence of a received signal, if the processors operate in a low-power mode, detecting, by the first processor, the remaining battery capacity, if the listening interval is detected, transmitting, by the first processor, an interrupt signal to the second processor operating in a low-power mode, if the remaining battery capacity is less than or equal to a threshold, and waking up, by the second processor, to interrupt the power of the portable terminal, upon receiving the interrupt signal.

In accordance with another aspect of the present invention, a method for battery gauging in a portable terminal is included. The method includes waking up in a low-power mode upon receiving an interrupt signal from a voltage detector, and interrupting the power of the portable terminal according to the interrupt signal.

In accordance with still another aspect of the present invention, an apparatus for battery gauging in a portable terminal is included. The apparatus includes a first processor for detecting the remaining battery capacity in a low-power mode during a listening interval for detection of the presence of a received signal, and for transmitting an interrupt signal to a second processor if the remaining battery capacity is less than or equal to a threshold, the second processor for waking up to interrupt the power of the portable terminal, upon receiving the interrupt signal from the first processor in a low-power mode, and a power unit for interrupting the power of the portable terminal under the control of the second processor.

In accordance with yet another aspect of the present invention, an apparatus for battery gauging in a portable terminal is included. The apparatus includes a voltage detector for generating an interrupt signal if the battery voltage is less than or equal to a threshold, a control unit for waking up in a low-power mode to interrupt the power of the portable terminal, upon receiving the interrupt signal from the voltage detector, and a power unit for interrupting the power of the portable terminal under the control of the control unit.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include techniques for reducing the power consumed for battery gauging in a portable terminal operating in a low-power mode. Herein, the low-power mode includes a sleep mode, an idle mode and the like. Also, the battery gauging includes a process for displaying the remaining battery capacity in a portable terminal.

First, a description is given of an exemplary apparatus for controlling a battery gauging period in a portable terminal.

Figure 1:
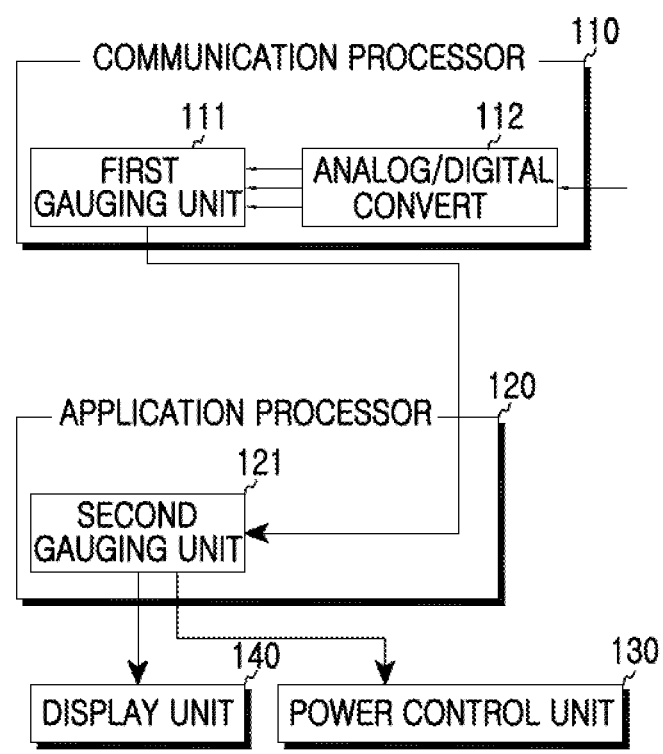
FIG. 1 is a block diagram of an apparatus for battery gauging in a portable terminal with multiple processors according to an exemplary embodiment of an embodiment of the present invention.

FIG. 1 is a block diagram of an apparatus for battery gauging in a portable terminal with multiple processors according to an exemplary embodiment of the present invention.

Referring to FIG. 1, the portable terminal includes a communication processor 110, an application processor 120, a power control unit 130, and a display unit 140.

The communication processor 110 controls voice communication and data communication of the portable terminal. Also, the communication processor 110 includes an Analog-to-Digital Converter (ADC) 112 and a first gauging unit 111 to perform periodic battery gauging. The ADC 112 converts an analog voltage value of the battery into a digital voltage value (hereinafter referred to as a gauging value). The first gauging unit 111 detects the gauging value output from the ADC 112. For example, when the portable terminal operates in a low-power mode, the communication processor 110 wakes up at a periodic listening interval in order to receive communication information. Accordingly, the communication processor 110 detects the remaining battery capacity in each listening interval. Herein, when the remaining battery capacity is less than or equal to a threshold, the communication processor 110 transmits an interrupt signal to the application processor 120.

The application processor 120 controls various media such as video, audio, data, and the like. In addition, the application processor 120 includes a second gauging unit 121 for displaying the gauging value received from the communication processor 110 on a display unit 140, and for transmitting a hardware power control signal to a power control unit 130 according to the interrupt signal received from the communication processor 110. Upon detecting the interrupt signal, the application processor 120 wakes up to perform the termination routine operation of the portable terminal.

In addition, as illustrated in FIG. 1, the application processor 120 does not include an ADC for detection of the remaining battery capacity. The reason for this is that the communication processor 110 including the ADC 112 can detect the remaining battery capacity.

Figure 2:
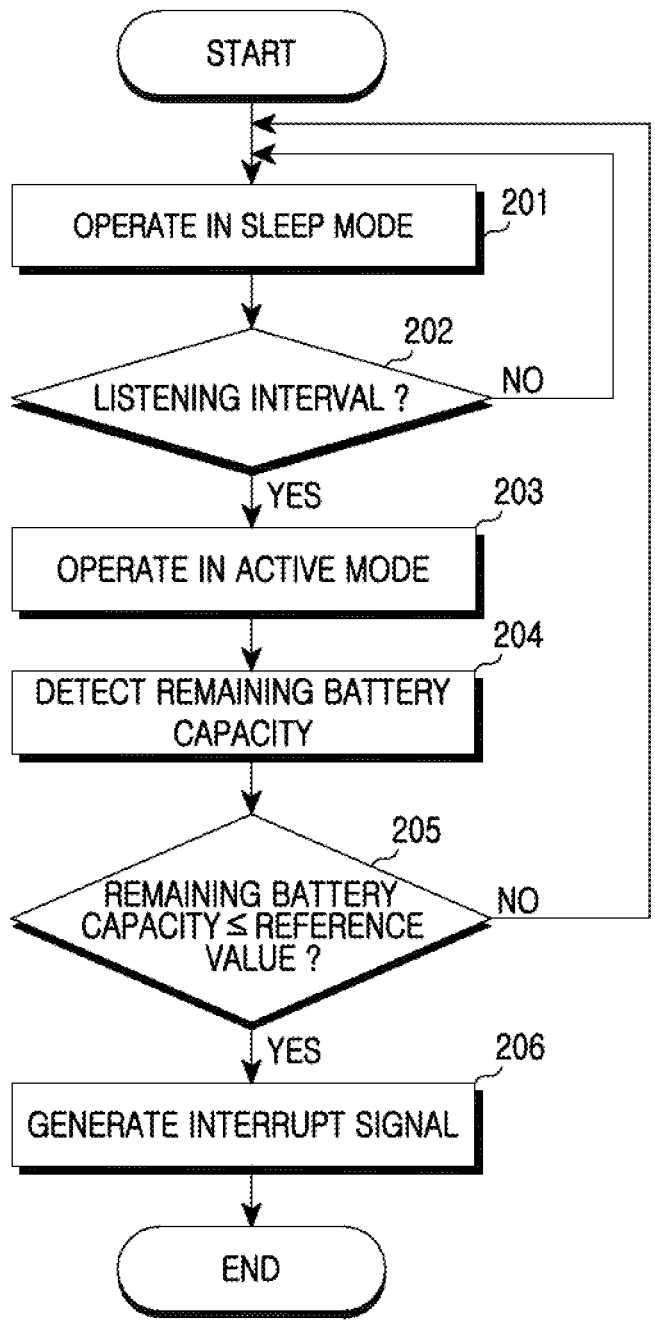
FIG. 2 is a flowchart illustrating a process of a communication processor for battery gauging in a portable terminal operating in a low-power mode according to an exemplary embodiment of the present invention.

FIG. 2 is a flowchart illustrating a process of a communication processor for battery gauging in a portable terminal operating in a low-power mode according to an exemplary embodiment of the present invention.

Referring to FIG. 2, in step 201, the communication processor 110 operates in a low-power mode (e.g. 'sleep mode') to reduce power consumption. For example, the communication processor 110 may operate in a low-power mode when communication is not performed for a preset time.

In step 202, the communication processor 110 determines whether a listening interval for receiving communication information occurs.

If it is determined that the listening interval does not occur in step 202, the communication processor 110 returns to 201 to operate in a low-power mode.

On the other hand, if it is determined that the listening interval occurs in step 202, the communication processor 110 wakes up (e.g. 'active mode') in step 203.

In step 204, the communication processor 110 detects the remaining battery capacity of the portable terminal.

In step 205, the communication processor 110 determines whether the remaining battery capacity detected is less than or equal to a threshold (e.g. 'reference value').

If it is determined that the remaining battery capacity is less than or equal to the threshold in step 205, the communication processor 110 proceeds to step 206. In step 206, the communication processor 110 generates an interrupt signal and transmits it to the application processor 120. In an exemplary implementation, the threshold may be the minimum possible driving voltage of the portable terminal.

On the other hand, if it is determined that the remaining battery capacity is greater than the threshold in step 205, the communication processor 110 returns to step 201 to operate in a low-power mode.

Thereafter, the communication processor 110 ends the process according to an exemplary embodiment of the present invention.

Although FIG. 2 exemplifies a portable terminal using two processors 110 and 120, the present invention is not limited thereto. In an exemplary implementation, the present invention may be applicable to portable terminals using one or more processors including a communication processor.

Exemplary embodiments of the present invention also may be applicable to a portable terminal using one processor that has a communication function and a function of controlling various media such as video, audio, data, and the like. In this case, the processor may perform the termination routine operation of the portable terminal directly without generating the interrupt signal when the remaining battery capacity is less than or equal to the threshold.

Figure 3:
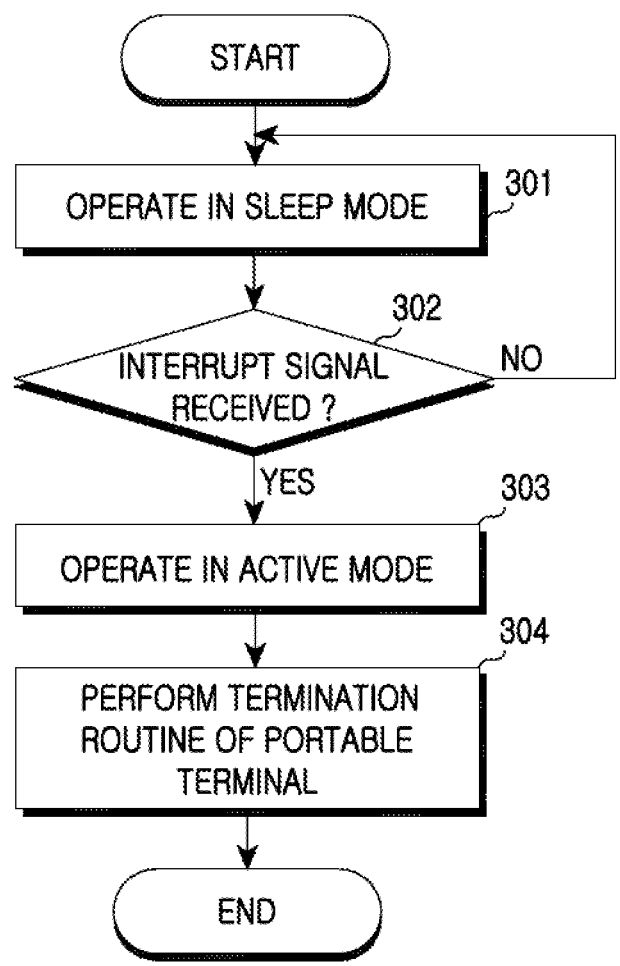
FIG. 3 is a flowchart illustrating a process of an application processor for battery gauging in a portable terminal operating in a low-power mode according to an exemplary embodiment of the present invention.

FIG. 3 is a flowchart illustrating a process of an application processor for battery gauging in a portable terminal operating in a low-power mode according to an exemplary embodiment of the present invention.

Referring to FIG. 1, in step 301, the application processor 120 operates in a low-power mode (e.g. 'sleep mode') for power consumption reduction.

In step 302, the application processor 120 determines whether an interrupt signal is received from the communication processor 110. As illustrated in FIG. 2, the communication processor 110, operating in the low-power mode, wakes up at a preset listening interval in order to update communication information, determines remaining battery capacity and generates the interrupt signal if the remaining battery capacity is less than or equal to the threshold.

If the interrupt signal is not received from the communication processor 110 in step 302, the application processor 120 returns to step 301 to maintain the low-power mode.

If the interrupt signal is received from the communication processor 110 in step 302, the application processor 120 wakes up in step 303.

In step 304, the application processor 120 performs a termination routine operation of the portable terminal.

For example, the termination routine may include operations such as displaying an indication that power is to be interrupted on the display unit 140, shutting down the internal components of the portable terminal, interrupting the power of the portable terminal, and the like.

Thus, it is not necessary to wake up the application processor 120 periodically in order to perform battery gauging in the portable terminal with multiple processors operating in a low-power mode. That is, the application processor 120 wakes up to perform the termination routine of the portable terminal only when the remaining battery capacity detected by the communication processor 110 in the listening interval is less than or equal to the minimum possible driving voltage.

Figure 4:
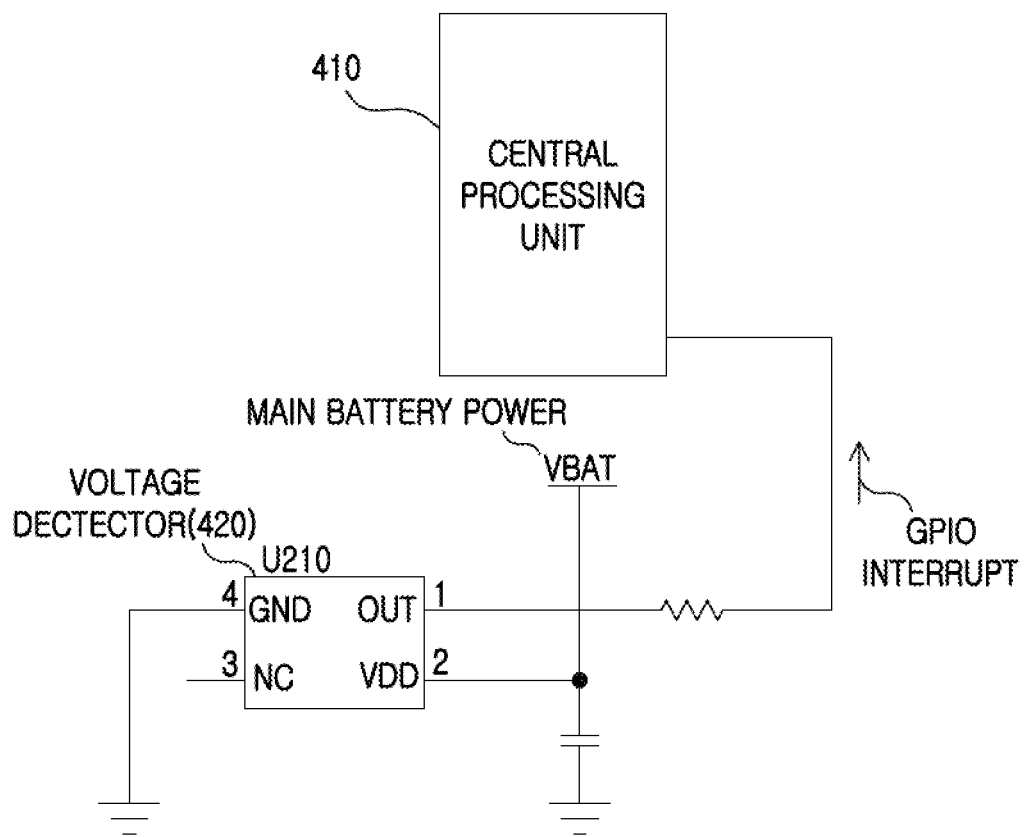
FIG. 4 is a circuit diagram including a voltage detector to reduce battery gauging power consumption according to an exemplary embodiment of the present invention.

FIG. 4 is a circuit diagram including a voltage detector to reduce the battery gauging power consumption according to an exemplary embodiment of the present invention.

Referring to FIG. 4, the portable terminal includes a Central Processing Unit (CPU) 410 and one or more voltage detectors 420.

The CPU 410 controls overall operations of the portable terminal. In particular, the CPU 410 performs a battery gauging operation according to an exemplary embodiment of the present invention.

The voltage detector 420 is connected to the CPU 410 in a General-Purpose Input/Output (GPIO) mode. Also, the voltage detector 420 is connected to a main battery power terminal to generate an interrupt signal when the battery voltage is less than or equal to a threshold.

In an exemplary implementation, the voltage detector 420 in the portable terminal operating in a low-power mode generates a GPIO interrupt signal when the detected battery voltage is less than or equal to the minimum possible driving voltage. Upon detecting the GPIO interrupt signal, the CPU 410 wakes up to perform the termination routine operation of the portable terminal. Herein, a power unit (not illustrated) of the portable terminal performs the termination routine operation under the control of the CPU 410.

Figure 5:
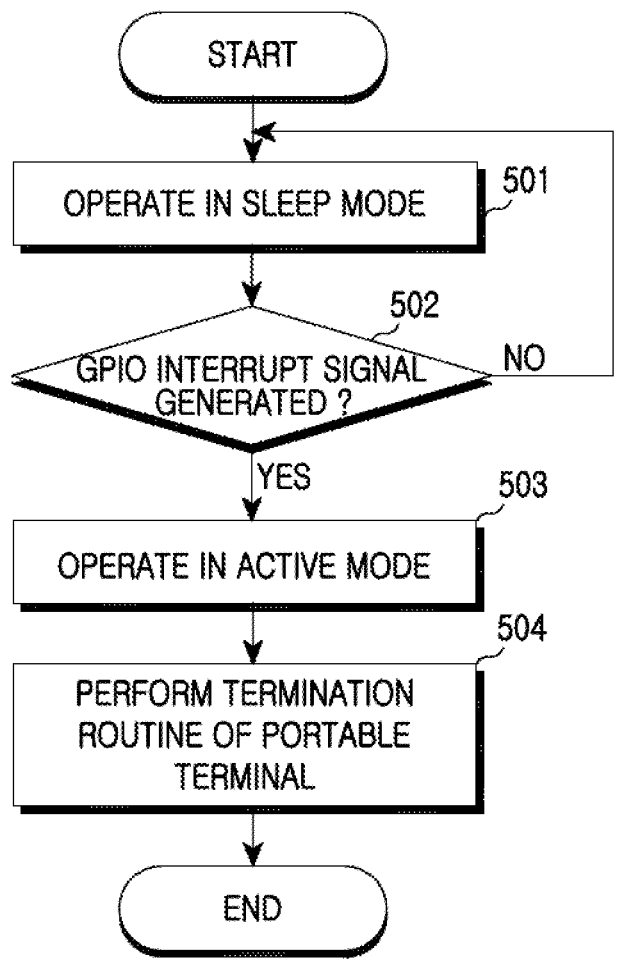
FIG. 5 is a flowchart illustrating a process for battery gauging in a portable terminal operating in a low-power mode according to an exemplary embodiment of the present invention.

FIG. 5 is a flowchart illustrating a process for battery gauging in a portable terminal operating in a low-power mode according to an exemplary embodiment of the present invention.

Referring to FIG. 5, in step 501, the CPU 410 operates in a low-power mode to reduce power consumption. For example, the CPU 410 may operate in the low-power mode when communication is not performed for a preset time.

In step 502, the CPU 410 determines whether the GPIO interrupt signal is generated by the voltage detector 420. As described above, the GPIO interrupt signal is generated by the voltage detector 420 only when the battery voltage is less than or equal to a threshold.

If it is determined that the GPIO interrupt signal is not generated in step 502, the CPU 410 returns to step 501 to maintain the low-power mode.

On the other hand, if it is determined that the GPIO interrupt signal is generated in step 502, the CPU 410 wakes up in step 503.

In step 504, the CPU 410 performs the termination routine operation of the portable terminal. As described above, the termination routine may include operations such as displaying a power interruption, shutting down the internal components of the portable terminal, and interrupting the power of the portable terminal.

As described above, exemplary embodiments of the present invention may reduce the battery gauging power consumption by not setting an additional battery gauging period but instead performing battery gauging only during the listening interval.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for battery gauging in a portable terminal having at least two processors, the method comprising:
    determining, by a first processor, whether a listening interval occurs for detecting the presence of a received signal, if the at least two processors operate in a low-power mode;
    detecting, by the first processor, the remaining battery capacity, if the listening interval is detected;
    transmitting, by the first processor, an interrupt signal to a second processor operating in the low-power mode, if the remaining battery capacity is less than or equal to a threshold; and
    waking up, by the second processor, to interrupt the power of the portable terminal upon receiving the interrupt signal.

2. The method of claim 1, wherein the low-power mode comprises one of a sleep mode and an idle mode.

3. The method of claim 1, further comprising maintaining the low-power mode if the remaining battery capacity is greater than the threshold.

4. The method of claim 1, wherein the threshold comprises a minimum driving voltage of the portable terminal.

5. The method of claim 1, wherein the detecting of the remaining battery capacity comprises converting an analog voltage signal of the battery into a digital voltage signal.

6. A method for battery gauging in a portable terminal, the method comprising: waking up in a low-power mode upon receiving an interrupt signal from a voltage detector; and interrupting the power of the portable terminal according to the interrupt signal, and wherein the interrupt signal is transmitted by the voltage detector in the low-power mode to inform that the remaining battery capacity is less than a minimum driving voltage of the portable terminal.

7. The method of claim 6, wherein the low-power mode comprises one of a sleep mode and an idle mode.

8. An apparatus for battery gauging in a portable terminal, the apparatus comprising:
    a first processor for detecting the remaining battery capacity in a low-power mode during a listening interval for detection of the presence of a received signal, and for transmitting an interrupt signal to a second processor if the remaining battery capacity is less than or equal to a threshold;

the second processor for waking up to interrupt the power of the portable terminal upon receiving the interrupt signal from the first processor in a low-power mode; and a power unit for interrupting the power of the portable terminal under the control of the second processor.

9. The apparatus of claim 8, wherein the low-power mode comprises one of a sleep mode and an idle mode.

10. The apparatus of claim 8, wherein the first processor maintains the low-power mode if the remaining battery capacity is greater than the threshold.

11. The apparatus of claim 8, wherein the first processor compares the remaining battery capacity with a minimum driving voltage of the portable terminal.

12. The apparatus of claim 8, wherein the first processor comprises:

an Analog-to-Digital Converter (ADC) for converting an analog voltage signal of the battery into a digital voltage signal; and a gauging unit for detecting the digital voltage signal as the remaining battery capacity and for comparing the digital voltage signal with the threshold.

13. An apparatus for battery gauging in a portable terminal, the apparatus comprising:

a voltage detector for generating an interrupt signal if the battery voltage is less than or equal to a threshold;

a control unit for waking up in a low-power mode to interrupt the power of the portable terminal upon receiving the interrupt signal from the voltage detector; and a power unit for interrupting the power of the portable terminal under the control of the control unit.

14. The apparatus of claim 13, wherein the voltage detector is connected to the control unit in General-Purpose Input/Output (GPIO) mode.

15. The apparatus of claim 13, wherein the voltage detector generates the interrupt signal if the remaining battery capacity is less than or equal to the minimum possible driving voltage of the portable terminal.

16. The apparatus of claim 13, wherein the low-power mode comprises one of a sleep mode and an idle mode.

17. An apparatus for battery gauging in a portable terminal having at least two processors, the apparatus comprising:

means for determining, by a first processor, whether a listening interval occurs for detecting the presence of a received signal, if the at least two processors operate in a low-power mode;

means for detecting, by the first processor, the remaining battery capacity, if the listening interval is detected;

means for transmitting, by the first processor, an interrupt signal to a second processor operating in the low-power mode, if the remaining battery capacity is less than or equal to a threshold; and means for waking up, by the second processor, to interrupt the power of the portable terminal upon receiving the interrupt signal.

18. The apparatus of claim 17, wherein the low-power mode comprises one of a sleep mode and an idle mode.

19. The apparatus of claim 17, further comprising means for maintaining the low-power mode if the remaining battery capacity is greater than the threshold.

20. The apparatus of claim 17, wherein the threshold comprises a minimum driving voltage of the portable terminal.

21. The apparatus of claim 17, wherein the means for detecting of the remaining battery capacity comprises means for converting an analog voltage signal of the battery into a digital voltage signal.

* * * * *